Figure 1:
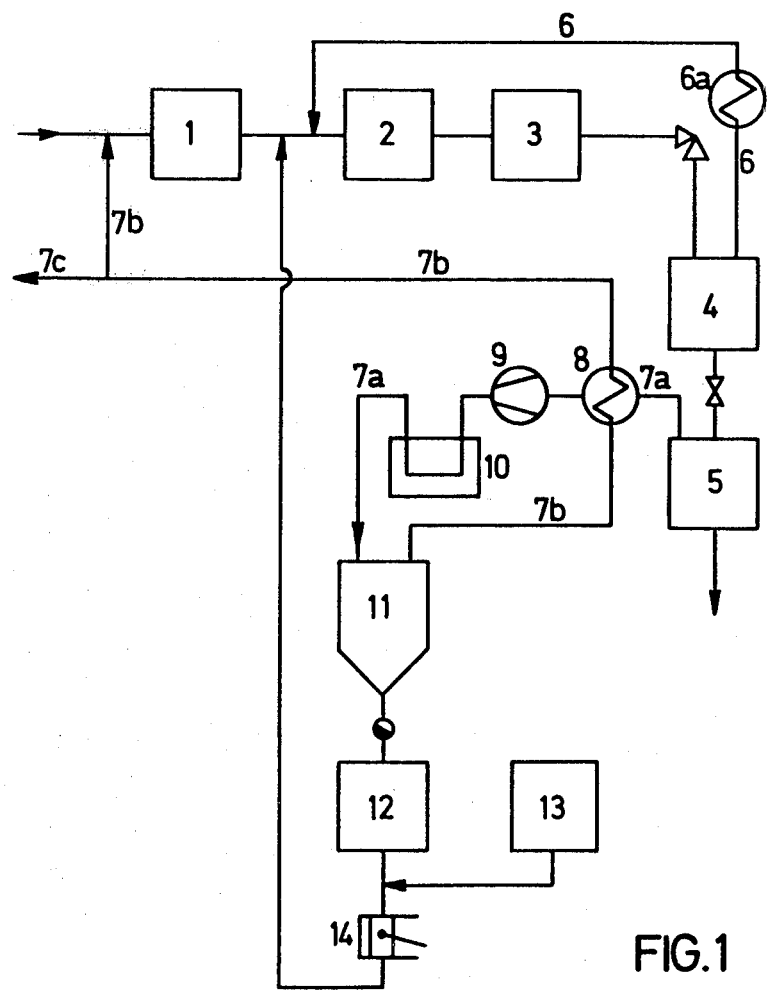

United States Patent [19]

Zacher et al.

[11] 4,217,431

[45] Aug. 12, 1980

[54] MANUFACTURE OF ETHYLENE COPOLYMERS

[75] Inventors: Wieland Zacher; Klaus Pfleger; Klaus Boettcher, all of Wesseling; Ronald Skorczyk, Bonn-Oberkassel; Oskar Buechner, Dudenhofen, all of Fed. Rep. of Germany

[73] Assignee: BASF Aktiengesellschaft, Fed. Rep. of Germany

[21] Appl. No.: 2,330

[22] Filed: Jan. 10, 1979

[30] Foreign Application Priority Data

Jan. 24, 1978 [DE] Fed. Rep. of Germany ....... 2802866

[51] Int. Cl.$^2$ ............................ C08F 2/34; C08F 6/00
[52] U.S. Cl. ...................................... 526/68; 526/64; 526/331; 528/501
[58] Field of Search ..................... 526/64, 68, 352.2; 528/501

[56] References Cited

U.S. PATENT DOCUMENTS

| | | | |
|---|---|---|---|
| 3,117,953 | 1/1964 | Gobel et al. | 528/501 |
| 3,184,444 | 5/1965 | Eilbracht et al. | 526/68 |
| 3,306,889 | 2/1967 | Schappert | 526/64 |
| 3,336,281 | 8/1967 | Eilbracht et al. | 526/68 |
| 3,577,224 | 5/1971 | Hess et al. | 526/68 |

*Primary Examiner*—Edward J. Smith
*Attorney, Agent, or Firm*—Keil & Witherspoon

[57] ABSTRACT

A continuous process for the manufacture of ethylene copolymers under high pressure and at high temperature in a polymerization zone, with transfer of the reaction mixture into a high pressure product isolation zone and from there into a low pressure product isolation zone, and recycling of the unconverted gas from the high pressure product isolation zone into the polymerization zone and from the low pressure product isolation zone into a low temperature separator, from where the comonomer separated off is recycled to the polymerization process, while the ethylene is discharged as off-gas. The gas taken off the low pressure product isolation zone is preferably compressed to from 10 to 20 bar and cooled to from $-10°$ to $-30°$ C. before it is fed into the low temperature separator. There is a substantial improvement in the efficiency of separating off the comonomer.

2 Claims, 2 Drawing Figures

MANUFACTURE OF ETHYLENE COPOLYMERS

The present invention relates to a process for the continuous manufacture of ethylene copolymers.

In this process, ethylene copolymers are obtained by copolymerization of ethylene with comonomers copolymerizable therewith, in a polymerization zone at pressures of from 1,500 to 5,000 bar and at from 150° to 350° C. in the presence of polymerization initiators which decompose into free radicals, transfer of the resulting reaction mixture into a high pressure product isolation zone at a pressure of from 100 to 500 bar and at from 150° to 250° C., then into a downstream low pressure product isolation zone at a pressure of from 1 to 10 bar and at from 150° to 250° C., and thereafter into a discharge extruder, and recycling of the unconverted gas, comprising ethylene and comonomers, from the high pressure product isolation zone and the low pressure product isolation zone to the polymerization process.

In such processes, measures are required in order to isolate the comonomers, not converted during the copolymerization, from the ethylene recycle streams before recycling to the polymerization process, the comonomers being used either for further polymerizations or for other purposes. The unconverted gas is, in these processes, usually recycled in two ethylene recycle streams, one originating from the high pressure product isolation zone and being referred to as high pressure recycle gas and the other originating from the low pressure product isolation zone and being referred to as low pressure recycle gas. The recycling of gas in the high pressure polymerization of ethylene is well-known and is described, for example, in U.S. Pat. No. 3,117,953, "Ullmann's Enzyklopädie der technischen Chemie", Verlag Urban & Schwarzenberg, Munich and Berlin, 1963, 3rd edition, volume 14, pages 139-145, and "Kunststoffhandbuch", Verlag Carl Hanser, Munich 1969, volume IV, pages 39-52.

Using the conventional processes, the unconverted monomer is separated off from the recycle gas of the plant by expanding part or all of the gas from the high pressure loop which is operated at pressures of from 100 to 500 bar. During this expansion, the gas mixture cools to below 0° C., and the comonomers concerned separate out more or less completely, in accordance with their vapor pressure. All or part of the gas mixture in the high-pressure circuit is expanded into a low temperature separator. The entire amount of gas coming from the low pressure product isolation zone is also fed into this low temperature separator. The low temperature separators are well-known and are described, for example, in German Pat. No. 954,921, German Pat. No. 1,445,229 and U.S. Pat. No. 3,336,281.

The conventional processes operating on the principle described have the disadvantage that they are uneconomical and that on expanding the gas mixture from the high pressure loop waxy low molecular weight materials are separated off together with the comonomers in the low temperature separator. These products discharged from the high pressure loop are obtained as solids, cause problems in draining the separated-off comonomers from the low temperature separator into the downstream receiver and make it impossible to re-use the comonomers in the polymerization process without prior purification. The uneconomical nature of the conventional processes is due to the fact that the gas expanded from the high pressure loop in order to produce the lower temperatures in the low temperature separator, the amount of this gas being substantially greater than the amount of off-gas to be purified, must, on re-use, be recompressed to 100–500 bar, preferably 250–350 bar. A further disadvantage of the conventional processes is that the ethylene discharged from the polymerization process as off-gas still contains substantial proportions of comonomers which are lost or must be destroyed if a gas purification is carried out. For example, if the ethylene off-gas discharged from the process is used for further purposes, the comonomer constituents present in this off-gas have adverse effects on alkylations, hydrogenations and other chemical processes, in that they act as catalyst poisons.

It is an object of the present invention to modify the process described at the outset, so as to be able to separate off, more efficiently and more economically, the comonomers not converted in the polymerization process, and so that, furthermore, only small amounts of comonomers remain in the off-gas.

We have found that this object is achieved, according to the invention, if exclusively the gas taken off the low pressure product isolation zone is compressed, cooled and fed into a low temperature separator, and the comonomers separated off are recycled to the polymerization process.

According to a preferred embodiment of the process, the gas from the low pressure product isolation zone is compressed to from 10 to 20 bar and cooled to from −10° to −30° C. before entering the low temperature separator.

The advantage achievable by means of the invention is in particular a distinct improvement in the efficiency of separating off the comonomer. In the process of the invention, no solids and waxes from the high pressure loop, which would make re-use of the comonomers separated off impossible, separate out together with the comonomer. The process according to the invention has the further advantage that the comonomers separated off can be directly recycled to the polymerization process, without undergoing purification. Only small amounts of comonomer constituents remain in the off-gas from the process according to the invention. In addition, no gas from the high pressure loop is expanded, so that no expensive recompression of the circulating gas from the high pressure product zone is needed.

For the purposes of the invention, ethylene copolymers means those copolymers of ethylene which can be manufactured under the stated conditions of temperature and pressure. The term ethylene copolymer embraces copolymers which contain up to 50 percent by weight, preferably from 0.1 to 30 percent by weight, of copolymerized comonomers and which have a melt index of from 0.1 to 50 g/10 min, determined according to ASTM D 1238-65 T at 190° C. under a load of 2.16 kg, and a density of from 0.890 to 0.934 g/cm$^3$, measured in accordance with DIN 53,479.

Copolymers of ethylene accordingly means the ethylene copolymers which can be manufactured at pressures of from 1,500 to 5,000 bar and at from 150° to 350° C. Any polymerization initiator and chain transfer agent conventionally used in the high pressure copolymerization of ethylene may be employed in the present process. Suitable comonomers copolymerizable with ethylene include all compounds copolymerizable with ethylene at the stated temperatures and pressures. Examples of such comonomers are vinyl esters of $C_2$–$C_4$-alkanecarboxylic acids, eg. vinyl acetate and vinyl propionate, $C_2$–$C_4$-alkyl esters of $C_3$–$C_4$-alkenecarboxylic acids, eg. n-butyl or tert.-butyl acrylate, acrylonitrile, acrylamide, $C_2$–$C_4$-alkenecarboxylic acids, e.g. acrylic acid, and vinyl ethers derived from alkenes of 3 to 8 carbon atoms. Advantageous initiators are oxygen, peroxides, eg. benzoyl peroxide, and azo compounds, eg. azo-bis-isobutyronitrile.

The process may be carried out using the conventional continuously operating high pressure polymerization systems. Polymerization zones means the conventional tubular reactors and stirred autoclaves. Tubular reactors means tubular polymerization vessels which have a length to diameter ratio, of the pressure-resistant tubes, of from 10,000:1 to 60,000:1. Autoclave reactors means pressure-resistant vessels having a length to diameter ratio of from 30:1 to 2.5:1. To achieve thorough mixing of the reaction mixture and hence good distribution of the heat generated, stirrers are fitted into the autoclaves. Information on processes employing tubular reactors or autoclave reactors may be found, for example, in "Ullmann's Enzyklopädie der technischen Chemie", 1963, 3rd edition, volume 14, pages 137–148.

Following the polymerization, the reaction mixture is passed into a high pressure product isolation zone, also referred to as a high pressure product separator, which is at a pressure of from 100 to 500 bar, preferably from 250 to 350 bar, and at from 150° to 250° C. In this high pressure product separator, the ethylene copolymer obtained in the reactor is separated from non-polymerized monomers. From the high pressure product separator the copolymer is fed into the low pressure product isolation zone, also referred to as a low pressure product separator. This is at a pressure of from 1 to 10 bar, preferably from 2.5 to 3.5 bar, and at from 150° to 250° C. The gas separated from the copolymer in the high pressure product separator, and consisting of ethylene and comonomers, is not expanded but instead, after passing through a secondary compressor, where it is brought back to the reaction pressure, is fed into the polymerization zone. In recycling the high pressure circulating gas to the polymerization process, no part of the gas employed at pressures above 100 bar is expanded. From the low pressure product isolation zone the copolymer obtained is fed in the conventional manner into a discharge extruder, where it is compounded. The vessels disclosed in the literature are employed as the high pressure and low pressure product separators.

The volatile components separated off in the low pressure product isolation zone, which consist of ethylene and comonomers, are compressed in a compressor and cooled in a cooling unit before being passed into a low temperature separator. The compressors and cooling units employed are of the conventional type, for example two-stage piston compressors and conventional refrigerators, respectively. In the low temperature separator, the comonomer is separated from the ethylene gas in the conventional manner. The comonomer constituents thus obtained are discharged continuously, via a bucket-type vapor trap into a collector separator. From the latter, the comonomers, together with comonomers freshly supplied from a reservoir, are introduced into the polymerization process by means of metering pumps. The ethylene separated off in the low temperature separator is in part used as recycle gas for further polymerization, and in part is fed into the off-gas line. Advantageously, about one-third of the stream of ethylene from the low pressure product separator is reintroduced into the polymerization process. In a preferred embodiment, the gas taken from the low pressure product separator is compressed in a compressor to from 10 to 20 bar, preferably from 14 to 16 bar, and is cooled in the cooling unit to from −10° to −30° C., preferably from −24° to −26° C., before passing into the low temperature separator referred to above.

EXAMPLE

The process according to the invention is described below in relation to the appended FIG. 1.

Per hour, a mixture comprising 9,460 kg of ethylene, 1,415 kg of vinyl acetate and 15 moles of oxygen per million moles of ethylene is compressed stepwise to 2,100 bar in a primary compressor (1) and a secondary compressor (2) and fed to a tubular reactor (3). In this reaction zone (3) the reaction mixture reaches a peak temperature of 305° C.; the heat of reaction which is liberated is removed by means of water under pressure. From the reactor (3), the reaction mixture passes into the high pressure product separator (4), which is under a pressure of 300 bar and at 220° C., and from there into the low pressure product separator (5), which is operated at a pressure of 3 bar and at 210° C. Per hour, 1,780 kg of a very homogeneous ethylene copolymer, having a density of 0.934 g/cm$^3$ and an MFI of 4.12 g/10 min., and containing 13.0 percent by weight of vinyl acetate as copolymerized units, are obtained.

No gas is expanded from the high pressure loop (6) into the low pressure separator (11); instead, the entire amount of gas from the high pressure product separator (4) is passed via line (6), through a cooling system (6a), to the secondary compressor (2). The vinyl acetate not converted in the reactor (3) is separated off by passing the entire quantity of gas, which amounts to 380 kg/hour and comes exclusively from the low pressure product separator (5), via line (7a) through a heat exchanger (8) and into a compressor (9), where it is recompressed from 3 to 15 bar; thereafter it is cooled to −25° C. in a cooling unit (10) and fed into the low temperature separator (11). 48.6 kg of vinyl acetate are obtained hourly in the collector separator (12) and are recycled to the process. About one-third of the ethylene which leaves the low temperature separator (11) and has been substantially freed from vinyl acetate is fed as recycle gas, through line (7b), to the primary compressor (1) (low pressure loop), whilst the remainder is discharged from the process, as off-gas, through line (7c). The 221 kg of off-gas discharged per hour contain 0.44 kg of vinyl acetate; this corresponds to a vinyl acetate content, in the off-gas, of 0.2 percent by weight. In addition to the 48.6 kg of vinyl acetate obtained in the collector separator (12), a further 232 kg of fresh vinyl acetate from reservoir (13), ie. a total of 280.6 kg per hour, are introduced into the copolymerization process by means of the metering pump (14).

COMPARATIVE EXAMPLE

Figure 2:
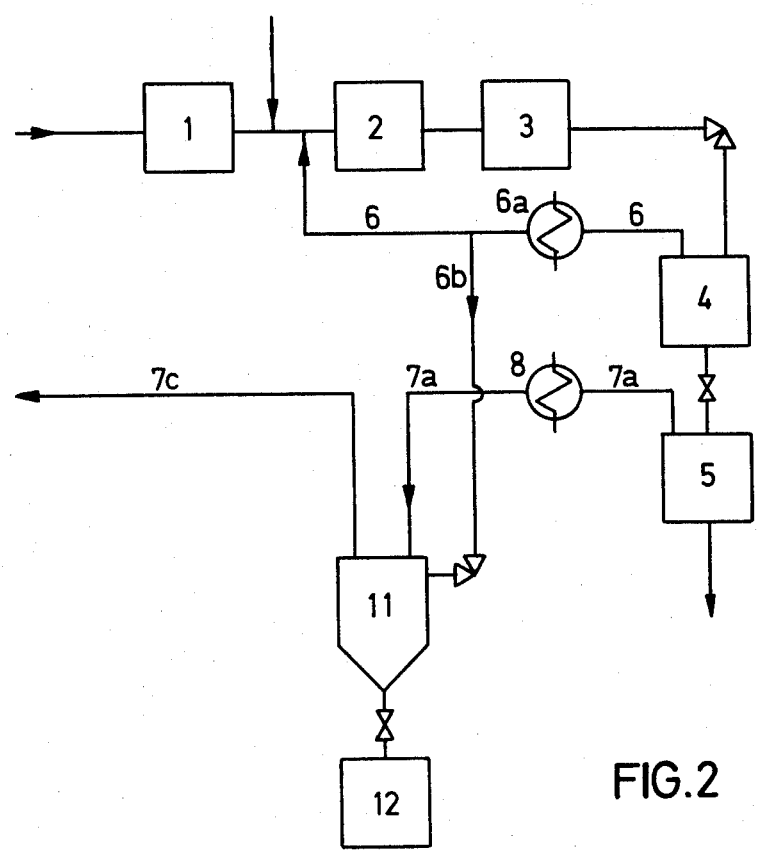

The prior art process will be described with reference to the appended FIG. 2:

As in Example 1 according to the invention, a mixture of 9,460 kg of ethylene, 1,415 kg of vinyl acetate and 15 moles of oxygen per million moles of ethylene is compressed stepwise to 2,100 bar in a primary compressor (1) and a secondary compressor (2) and fed into a tubular reactor (3). The conditions in the reactor (3), high pressure product separator (4) and low pressure product separator (5) conform to those stated in the example according to the invention. 1,780 kg of a homogeneous ethylene copolymer which has a density of 0.934 g/cm³ and a MFI of 4.12 g/10 min., and contains 13.0 percent by weight of vinyl acetate as copolymerized units, are obtained.

In contrast to the example according to the invention, the vinyl acetate not converted in the reactor (3) is separated off as follows: after passing through the cooling system (6a) a portion, namely 1,134 kg, of the gas mixture used in the high pressure loop (6) at 300 bar is expanded through line (6b) into the low temperature separator (11), whilst the main part of the circulating gas remains in the high pressure loop (6) and is fed to the secondary compressor (2). The entire amount of gas, namely 380 kg, from the low pressure product separator (5) is also passed into the low temperature separator (11) after having passed through the cooling system (8). The amount of vinyl acetate obtained in this low temperature separator (11) under a pressure of 3 bar and at $-25°$ C. is 181.5 kg. The ethylene (1,514 kg) leaving the low temperature separator (11) still contains 15.1 kg of vinyl acetate and must be discharged from the process as off-gas through the line (7c); this corresponds to the off-gas containing 1.0 percent by weight of vinyl acetate. The vinyl acetate obtained in the low temperature separator (11) cannot be re-used in the copolymerization process without prior purification, since it is excessively contaminated. 454 kg of fresh vinyl acetate need to be introduced into the process.

The amounts quoted in each case relate to a period of 1 hour.

| | COMPARSION | | |
|---|---|---|---|
| | Amount of VA introduced | Amount of VA separated off | Amount of VA contained in the off-gas |
| Example according to the invention | 280.6 kg/h$^{(xx)}$ | 48.6 kg/h$^{(x)}$ | 0.44 kg/h |
| Comparative Example | 454 kg/h | 181.5 kg/h | 15.1 kg/h |

$^{(x)}$is reintroduced into the process
$^{(xx)}$including the 48.6 kg of VA obtained in the separator, which can't be re-used
(VA = vinyl acetate)

The amounts quoted in each case relate to a period of 1 hour.

We claim:

1. A process for the continuous manufacture of ethylene copolymers by copolymerization of ethylene with comonomers copolymerizable therewith, in a polymerization zone at pressures of from 1,500 to 5,000 bar and at from 150° to 350° C. in the presence of polymerization initiators which decompose into free radicals, transfer of the resulting reaction mixture into a high pressure product isolation zone at a pressure of from 100 to 500 bar and at from 150° to 250° C., then into a downstream low pressure product isolation zone at a pressure of from 1 to 10 bar and at from 150° to 250° C., and thereafter into a discharge extruder, and recycling of the unconverted gas, comprising ethylene and comonomers, from the high pressure product isolation zone and the low pressure product isolation zone to the polymerization process, wherein exclusively the gas taken off the low pressure product isolation zone is compressed, cooled and fed into a low temperature separator, and the comonomers separated off are recycled to the polymerization process and wherein the unconverted gas from the high pressure product isolation zone is not expanded prior to reentry into the polymerization zone.

2. The process of claim 1, wherein the gas taken off the low pressure product isolation zone is compressed to from 10 to 20 bar and is cooled to from $-10°$ to $-30°$ C. before passing into the low temperature separator.

* * * * *